(12) United States Patent
Dalla Palma et al.

(10) Patent No.: US 12,209,657 B2
(45) Date of Patent: Jan. 28, 2025

(54) VEHICLE SYSTEM WITH HYDROMECHANICAL TRANSMISSION AND POWER MANAGEMENT STRATEGY

(71) Applicant: DANA ITALIA S.R.L., Trentino (IT)

(72) Inventors: Lorenzo Dalla Palma, Arco (IT); Fabio Gunsch, Arco (IT); Alessandro Dilisa, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/512,495

(22) Filed: Nov. 17, 2023

(65) Prior Publication Data

US 2024/0084891 A1    Mar. 14, 2024

Related U.S. Application Data

(63) Continuation of application No. 17/449,247, filed on Sep. 28, 2021, now Pat. No. 11,841,080.

(51) Int. Cl.
| | |
|---|---|
| *B60K 17/10* | (2006.01) |
| *B60K 6/12* | (2006.01) |
| *B60K 17/28* | (2006.01) |
| *F16H 47/04* | (2006.01) |
| *F16H 61/06* | (2006.01) |
| *F16H 61/4096* | (2010.01) |
| *F16H 61/00* | (2006.01) |
| *F16H 61/12* | (2010.01) |
| *F16H 61/21* | (2006.01) |

(52) U.S. Cl.
CPC ........... *F16H 61/4096* (2013.01); *B60K 6/12* (2013.01); *B60K 17/10* (2013.01); *B60K 17/28* (2013.01); *F16H 47/04* (2013.01); *F16H 61/061* (2013.01); *F16H 2061/0012* (2013.01); *F16H 2061/0034* (2013.01); *F16H 2061/124* (2013.01); *F16H 61/21* (2013.01)

(58) Field of Classification Search
CPC .... F16H 61/4096; F16H 47/04; F16H 61/061; F16H 61/21; F16H 2061/0012; F16H 2061/0034; F16H 2061/124; B60K 6/12; B60K 17/10; B60K 17/28
See application file for complete search history.

(56) References Cited

U.S. PATENT DOCUMENTS

| | | | |
|---|---|---|---|
| 3,583,256 A * | 6/1971 | Livezey | F16H 47/04 475/24 |
| 3,714,846 A * | 2/1973 | Louis | F16H 47/04 475/82 |
| 3,719,888 A | 3/1973 | Sampey | |

(Continued)

*Primary Examiner* — Frank B Vanaman
(74) *Attorney, Agent, or Firm* — McCoy Russell LLP

(57) ABSTRACT

Methods and systems for a hydromechanical transmission. In one example, a vehicle system includes a hydromechanical transmission with a power-take off (PTO) that is designed to rotationally couple to an implement. The vehicle system further includes an engine coupled to the hydromechanical transmission and a power-management control unit configured to, during a drive or coast condition, cause the power-management control unit to: determine a net available power for the hydromechanical transmission and manage a power flow between the hydromechanical transmission, a drive axle, and the implement based on the net available power.

16 Claims, 5 Drawing Sheets

(56) References Cited

U.S. PATENT DOCUMENTS

| | | | |
|---|---|---|---|
| 3,744,344 A * | 7/1973 | Olsen | F16H 47/04 |
| | | | 475/82 |
| 4,075,893 A | 2/1978 | Koch, Jr. | |
| 4,740,898 A | 4/1988 | McKee et al. | |
| 5,487,005 A | 1/1996 | Genise | |
| 7,344,473 B2 | 3/2008 | Ishibashi et al. | |
| 7,832,520 B2 | 11/2010 | Murakami et al. | |
| 8,532,888 B2 | 9/2013 | Ishibashi et al. | |
| 9,145,127 B2 * | 9/2015 | Uematsu | B60W 10/184 |
| 9,512,918 B2 | 12/2016 | Rozycki et al. | |
| 9,562,592 B2 | 2/2017 | Rekow et al. | |
| 10,029,556 B2 | 7/2018 | Morrow et al. | |
| 10,071,719 B2 | 9/2018 | Behm | |
| 10,407,864 B2 | 9/2019 | Miyamoto et al. | |
| 2005/0071068 A1 | 3/2005 | Funato et al. | |
| 2010/0089050 A1 | 4/2010 | Filla | |
| 2012/0004797 A1 * | 1/2012 | Baino | B60W 30/18127 |
| | | | 180/65.265 |
| 2012/0324879 A1 * | 12/2012 | Haugen | B60K 6/12 |
| | | | 137/511 |
| 2013/0006457 A1 | 1/2013 | Anders et al. | |
| 2016/0024754 A1 | 1/2016 | Miyamoto et al. | |
| 2017/0152928 A1 | 6/2017 | Byltiauw | |
| 2022/0213951 A1 | 7/2022 | Cai et al. | |

* cited by examiner

VEHICLE SYSTEM WITH HYDROMECHANICAL TRANSMISSION AND POWER MANAGEMENT STRATEGY

CROSS-REFERENCE TO RELATED APPLICATION

The present application is a continuation of U.S. Non-Provisional patent application Ser. No. 17/449,247, entitled "VEHICLE SYSTEM WITH HYDROMECHANICAL TRANSMISSION AND POWER MANAGEMENT STRATEGY", and filed on Sep. 28, 2021. The entire contents of the above-listed application are hereby incorporated by reference for all purposes.

TECHNICAL FIELD

The present disclosure relates to a vehicle system with a hydromechanical transmission and power management strategies for the vehicle system.

BACKGROUND AND SUMMARY

Vehicles with hydromechanical transmissions have used power-take offs (PTOs) to increase vehicle capabilities with regard to implements such as pumps, booms, bed lifts, winches, etc. Because of these expanded capabilities industries such as agriculture, construction, mining, material handling, oil and gas, and the like have deployed vehicles with hydromechanical transmissions. Certain vehicles may power auxiliary devices directly from the engine such as alternators, brake pumps, fan drives, etc. Power management in previous vehicles has been implemented using disparate controllers that each independently manage power flow for the implements, auxiliary devices, and drive axles.

U.S. Pat. No. 10,407,864 B2 to Miyamoto et al. teaches a control method for a work vehicle that determines horsepower requirements for an engine, a transmission, and an energy reservoir unit using separate control units. After the horsepower demands are determined, the system attempts to meet the demands using a convoluted control strategy that is carried out using the separate control units.

The inventors have recognized several drawbacks with Miyamoto's transmission control method as well as other prior hydromechanical transmissions that operate implements and the vehicle systems in which they are deployed. For example, Miyamoto uses disparate controllers to determine the different horsepower demands of the system's components. This complex strategy uses a large amount of computing resources and, in under conditions, impedes the system from efficiently managing power while meeting the power demands of the different components. Furthermore, Miyamoto's control method does not allow traction and implement priorities to be strategically managed or dynamically adjusted. Consequently, handling and/or implement performance is decreased. Further, other vehicles have, for example, experienced engine overload and engine inefficiencies that stem from uncoordinated power distribution strategies and the confinement of power distribution controls to each of the different control units. Engine overloading may be more likely to occur during combined maneuvers, especially during transients when the vehicle is accelerating and the implements are operated in tandem while increasing engine power. Additionally, due to the uncoordinated power distribution with regard to the implements and the drive axle, the amount of power allocation to each system may be fixed. The fixed power partitioning for the implements and traction therefore reduces traction power, when implement power is prioritized or vice versa. Moreover, previous engines have managed speed based on drive pedal input. However, in some maneuvers, such as extended road travel, this engine speed management scheme may lead to the engine working at a high speed and low load, which is undesirable from a fuel consumption perspective.

To address at least a portion of the abovementioned issues, the inventors developed a vehicle system. The vehicle system includes a hydromechanical transmission with a power-take off (PTO) designed to rotationally couple to an implement. The vehicle system further includes an engine coupled to the hydromechanical transmission. Even further, the system includes a power-management control unit. The power-management control unit is designed to determine a net available power in the hydromechanical transmission. Additionally, the power-management control unit is designed to manage a power flow between the hydromechanical transmission, a drive axle, and the implement based on the net available power. In this way, the power in the vehicle system may efficiently and effectively distribute energy to the power consuming components to achieve traction and implement performance targets.

Further, in one example, managing the power flow may include, during a combined maneuver when power is transferred to both the implement and the drive axle from the hydromechanical transmission, balancing the power flow to the implement and the drive axle from the hydromechanical transmission based on a priority of the implement and a priority of drive axle traction. Further, in such an example, the net available power may be the positive available power. As such, managing the power flow may include limiting an amount of power transferred to the drive axle from the hydromechanical transmission based on a first percentage of the net available power and limiting an amount of power transferred to the hydromechanical transmission from the implement based on a second percentage of the net available power. In this way, the power flow may be strategically split between the implement and the drive axle based on assigned percentages that may tailor the power split to specific end-use vehicle operating environments, customer preferences, and the like.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A cooperative power management strategy for a vehicle system with a hydromechanical transmission having power take-offs (PTO) that attach to implements is described herein. The power management strategy calculates a net available power (positive and/or negative available power) and controls power allotment for the implements and traction using the net available power. This collective power management technique permits the engine to operate with greater efficiency (e.g., low speed and high torque) based on the system's aggregate power demands. Further, the power management technique allows power to be strategically distributed to the system's power consumers during transients to reduce the chance of, and in some cases prevent, engine overload, especially during combined maneuvers where the vehicle is both accelerating and delivering power to an implement via a PTO. Further, the power management system described herein permits the balance of power distributed for the implements and traction to be adjusted, if desired. For instance, original equipment manufacturers (OEMs) of different implements may have different priorities for power distribution, and the system therefore allow s for greater power distribution flexibility, thereby increasing customer appeal. Still further, because of the cooperative power management technique that takes into account net system power demands, auxiliary systems or components may be activated to use excess energy during vehicle deceleration to further increase system efficiency and decrease engine fuel consumption. Further, activation of an engine brake system (e.g., retarder) may be performed in concert with vehicle maneuvers and may not solely depend on engine speed. Consequently, engine brake system activation may be avoided in short reversing maneuvers, thereby increasing vehicle performance.

Figure 1:
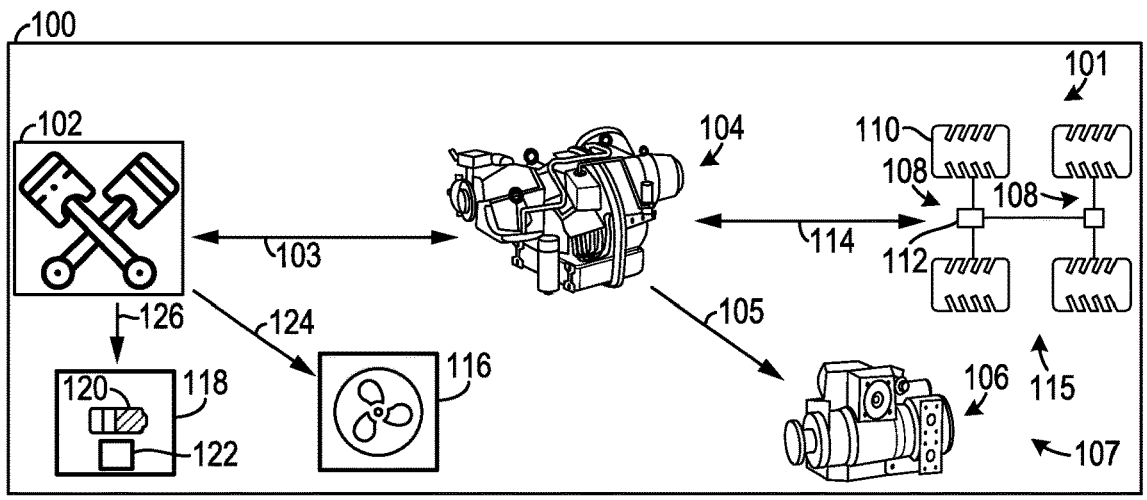
FIG. 1 is an illustration of power management architecture in a vehicle with a hydromechanical transmission that powers implements.

FIG. 1 shows an illustration of a power management architecture in a vehicle 100 with a vehicle system 101. The vehicle may be an off-highway vehicle, in one example, although on-highway vehicles have also been envisioned. An off-highway vehicle may be a vehicle whose size and/or maximum speed precludes the vehicle from being operated on highways for extended durations. For instance, the vehicle's width may be greater than a highway lane and/or the vehicle top speed may be below the minimum allowable highway speed, for example. Industries and the corresponding operating environments in which the vehicle may be deployed include forestry, mining, agriculture, construction, oil and gas, and the like.

The vehicle 100 includes an engine 102. The engine 102 may be an internal combustion engine designed for compression ignition and/or spark ignition. For instance, in one example, the engine 102 may be a compression ignition engine configured to combust diesel fuel. The engine may additionally or alternatively be designed to combust other suitable fuels such as gasoline, biodiesel, alcohol blends, and the like. As such, the engine may include conventional components to carry out cyclical combustion operation such as one or more cylinders, an intake system, an exhaust system, a fuel delivery system, and the like.

The vehicle 100 further includes a transmission 104 mechanically coupled to the engine 102. Arrows 103 signify the flow of power between the engine 102 and the transmission 104. In one example, the transmission 104 may be a hydromechanical variable transmission (HVT). For instance, the transmission may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency in relation to transmissions which operate in discrete ratios. Alternatively, the transmission 104 may be another type of continuously variable transmission (CVT) capable of seamlessly shifting through a continuous range of gear ratios, such as a hydrostatic CVT that uses a variable displacement pump and a hydraulic motor, for instance. Other suitable automatic transmissions such as dual-clutch transmissions (DCTs) that employ two input clutches, may be used, in the vehicle, in other examples.

The vehicle 100 further includes implements 106 that are connected to PTOs in the transmission 104. The implements may more generally be included in an implements system 107. The implements may include or be driven by a pump that is coupled to a gearbox PTO. For instance, the implement may include hydraulic implements (e.g., a steering system, a braking system, working functions, a cooling fan, accessories, etc.) and/or pneumatic implements (e.g., pneumatic system for seed/liquid distribution, working functions, pneumatic pistons, etc.). It will be understood, that numerous suitable types of implements may be used in the vehicle system. Arrows 105 denote the power transfer that occurs between the transmission 104 and the implements 106, during operation.

The transmission 104 may further be coupled to one or more drive axles 108 and wheels 110. The drive axle(s) 108 may each include a differential 112 (e.g., an open differential, a locking differential, a limited slip differential, and the like) that drive axle shafts which are coupled to the drive wheels 110. Arrows 114 denote the flow of power between the transmission 104 and the axles and drive wheels and vice versa. These traction components, such as the drive axles and the drive wheels, may be referred to as a traction system 115.

The vehicle 100 may further include one or more auxiliary components 116 and/or auxiliary systems 118. The auxiliary system(s) 118 may include an energy accumulator 120 (e.g., a hydraulic accumulator), a retarder 122 (e.g., an engine brake), and the like. The auxiliary component(s) 116 may include an alternator, a water pump, a fan drive, a brake pump, etc. Generally, the auxiliary system(s) 118, during certain conditions, may receive excess power from the engine and use (e.g., waste) or store the excess energy. The auxiliary component(s) 116 and/or auxiliary system(s) 118, when in operation, receive power from the engine 102. The power flow between the engine 102 and the auxiliary components 116 as well as the auxiliary systems 118 is denoted via arrows 124, 126. The aforementioned power flows between any of the system components may be carried out using any suitable mechanical components such as shafts, gears, chains, attachment interfaces, combinations thereof, and the like.

Figure 2:
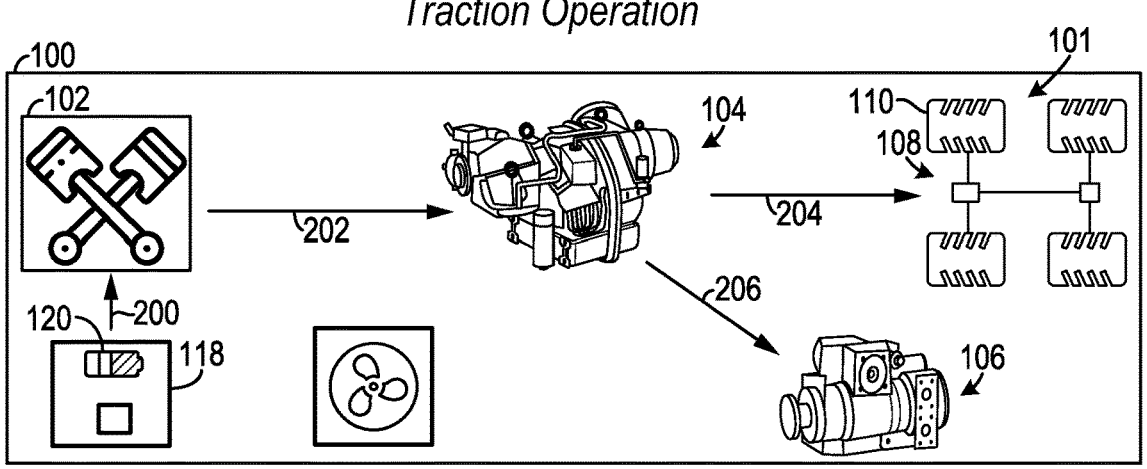
FIG. 2 is an illustration of a power flow in the vehicle system, depicted in FIG. 1, during traction operation.
Figure 3:
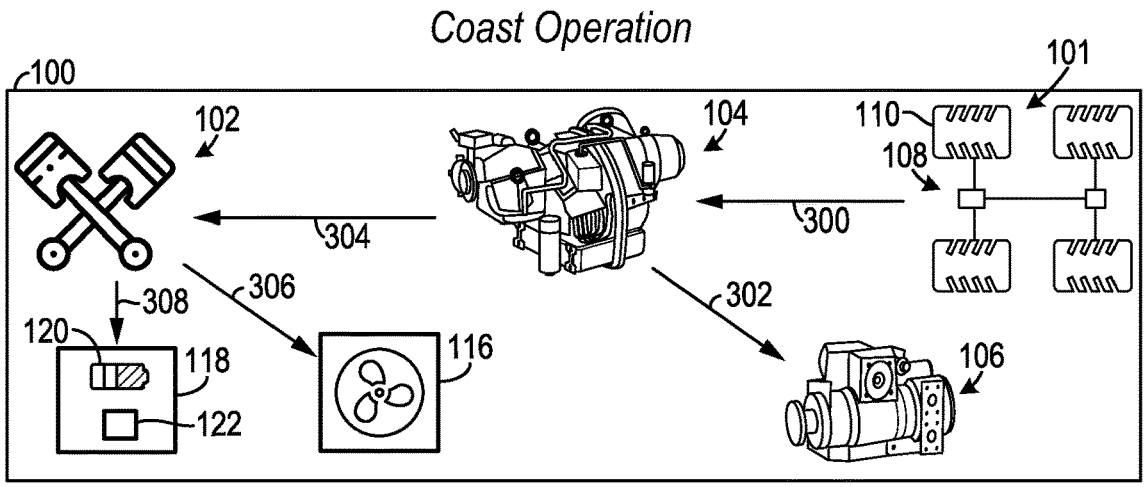
FIG. 3 is an illustration of a power flow in the vehicle system, depicted in FIG. 1, during coast operation.

FIGS. 2 and 3 depict the vehicle system 101 in different power flow arrangements. Specifically, FIG. 2 illustrates the vehicle system 101 operating under a traction power flow condition and FIG. 3 conversely shows the vehicle system 101 operating under a coasting power flow condition. The traction power flow configuration may be referred to as a drive condition and the coasting power flow condition may be referred to as a coast condition.

Referring specifically to FIG. 2, in the power path, power may be transferred from the auxiliary system(s) 118 (e.g., the energy accumulator 120) to the engine 102, signified via arrow 200. Next, power flows from the engine 102 to the transmission 104, denoted via arrow 202. From the transmission 104, power flows to the implements 106 and the axle(s) 108 and wheels 110, indicated via arrows 204. Additionally, power may flow from the transmission 104 to the implement(s) 106 which is denoted by arrow 206. In this way, the implements may be operated during traction operation, if desired.

Turning to FIG. 3, in the power flow path, power flows from the wheels 110 and axle(s) 108 to the transmission 104, denoted by arrow 300. From the transmission 104, power flows to the implement(s) 106, indicated via arrows 302. Further, from the transmission 104, power flows to the engine 102 which is signified by arrow 304. Under some conditions, power may flow from the engine 102 to the auxiliary component(s) 116 and auxiliary system(s) 118 (e.g., the retarder 122 and/or the energy accumulator 120), indicated by arrows 306, 308, respectively. In this way, the auxiliary components and systems as well as the implements may receive power during vehicle coasting.

Figure 4:
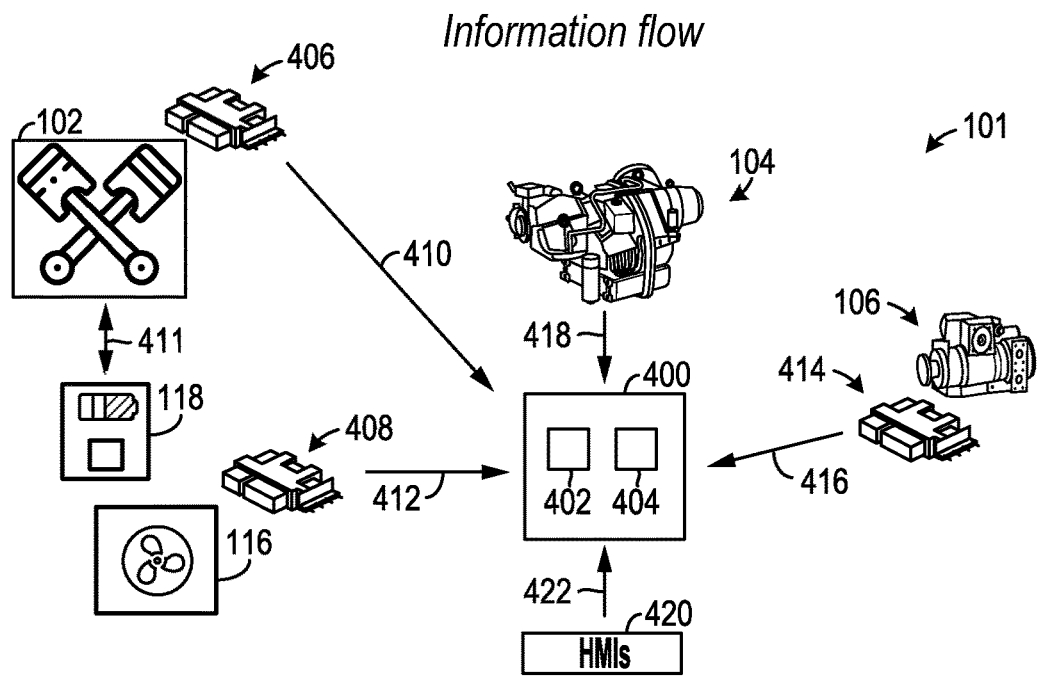
FIG. 4 is an illustration of a data gathering information flow for a power-management control unit in the vehicle system, depicted in FIG. 1.

FIG. 4 shows a power management information flow in the vehicle system 101. To coordinate and efficiently balance power flow in the system, a power-management control unit 400 is provided in the system. The power-management control unit 400 as well as the other control units described herein may include a processor 402 (e.g., a microprocessor) and memory 404. The memory 404 may include instructions stored therein that when executed by the processor 402 cause the control unit to perform the methods, control techniques, etc., described herein. The processor 402 may include a microprocessor unit and/or other types of circuits. The memory 404 may include known data storage mediums such as random access memory, read only memory, keep alive memory, combinations thereof, etc. Further, the hardware of the power-management control unit 400 may be collocated in a common enclosure, in one example. Alternatively, the hardware may be included in two or more housings that may be located in different areas of the vehicle. The other control units described herein may be constructed similarly with regard to memory and processors as well as the enclosures that house the control unit hardware.

The power-management control unit 400 may receive data in the form of signals from other control units in the vehicle. Specifically, the power-management control unit 400 interacts with other electronic controllers in the vehicle system to receive information related to power flow between different components. As such, the power-management control unit 400 may receive operating conditions data (e.g., engine speed, engine power, available engine power, implements power demands, etc.) that is relayed through the other control units and/or directly from vehicle sensors, systems, components, devices, and the like.

The other control units may include an engine control unit (ECU) 406. The ECU 406 may be designed to adjust engine operation such as increasing or decreasing engine power, engine speed, etc. via adjustment of a throttle, fuel injection, etc. Further, the ECU may provide a method for calculating a net available power at the current (e.g., real-time) system conditions. Arrow 410 depicts the flow of power data from the ECU 406 to the power-management control unit 400 such as a maximum and a minimum available net engine power and energy absorbed, stored, and/or provided to the engine by the auxiliary systems 118. Further, arrow 411 indicates the transfer of power data between the auxiliary systems 118 and the engine 102.

A vehicle control unit (VCU) 408 may further be included in the vehicle system 101. The VCU 408 may be designed to control adjustment of the auxiliary components 116 and/or systems 118. Additionally, the VCU 408 may provide a method for calculating uncontrollable power absorption of the vehicle auxiliary components 116 and/or systems 118 at the current (e.g., real-time) system conditions. Arrow 412 signifies the transfer of power data from the VCU 408 to the power-management control unit 400 such as power absorbed from the auxiliary components 116.

The vehicle system 101 may further include an implements control unit (ICU) 414. The ICU is designed to control adjustment of the implements 106. For instance, the ICU may trigger extension and retraction of a hydraulic boom. Additionally, the ICU may provide a method that estimates the power absorption of an implement pump. To elaborate, in one specific example, the ICU may carry out the method for estimating the power absorption of the implement pump only if the power used by the implement pump is not electronically limited. Arrow 416 indicates the transfer of power data from the ICU to power-management control unit 400 such as the power absorbed by the implements 106. The power-management control unit 400, such as implements power absorption. Thus, the power-management control unit 400 interacts with the aforementioned control units (the ECU, VCU, and ICU) to receive power flow data.

The power-management control unit 400 may be included in a transmission control unit (TCU) that is designed generate operating data for the transmission such as transmission gear ratio, losses, clutch configuration, hydrostatic pump configuration (e.g., pump swivel angle), input and output shaft speed, and the like. As such, arrow 418 indicates the flow of power data from sensors in the transmission 104, for example, to the power-management control unit 400. However, in other examples the power-management control unit may be distinct from the TCU.

The vehicle system 101 may further include human machine interfaces (HMIs) 420. The HMIs 420 may include an accelerator device (e.g., accelerator pedal), brake device (e.g., brake pedal), gear selector, implement control devices (e.g., implement joysticks, buttons, and the like), a touch interface, a graphical user interface (GUI), combinations thereof, and the like. Arrow 422 denotes the transfer of HMI data, such as data indicative of operator interaction with the input devices to request adjustment of selected vehicle components. For instance, the operator may request an increase in vehicle acceleration via accelerator pedal depression, a decrease in vehicle speed via brake pedal depression, or increased or decreased implements power usage via interaction with the implement control device. Thus, the power-management control unit 400 may receive traction and implements adjustment requests from the HMIs.

Responsive to the power request and usage information collection, the power-management control unit 400 may determine various operating conditions and send control commands to different components in the vehicle system. However, prior to generating control commands, the power-management control unit 400 may calculate a net available power (e.g., a positive and/or negative net available power) that the transmission 104 is capable of using for traction and implements. To elaborate, a net positive available power (e.g., maximum net positive available power) may be calculated by the power-management control unit 400. The net positive available power may be referred to as pull and may be computed by subtracting vehicle auxiliary absorbed power and transmission power losses from the maximum available engine power. The net negative available power may be referred to as drag and may be computed by adding the minimum power absorbed by the auxiliary components and/or systems (e.g., energy accumulator, retarder, cooling fan, etc.) to the minimum engine drag power. However, the net positive and negative available power may be calculated using other algorithms, in alternate examples.

Figure 5:
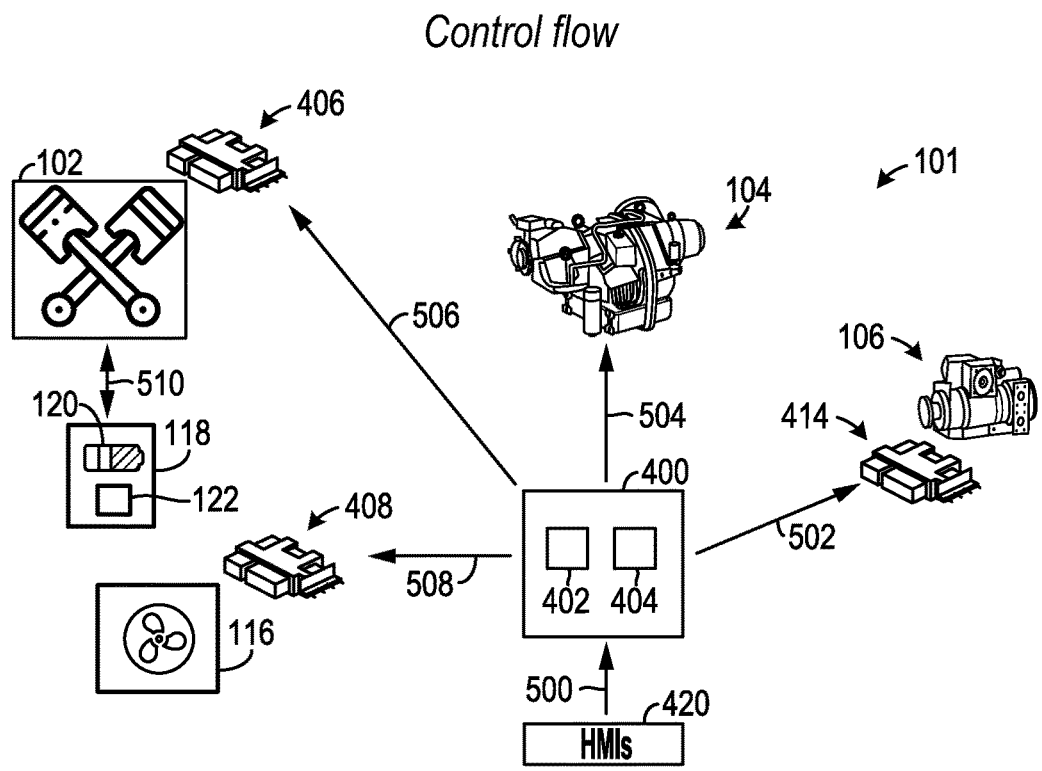
FIG. 5 is an illustration of a control data flow for the power-management control unit in the vehicle system, depicted in FIG. 1.

FIG. 5 illustrates the power-management control unit 400 control flow. As shown, during a transmission control scheme, the power-management control unit 400 may receive traction and implements requests from the HMIs as denoted by arrow 500. Further, the power-management control unit 400 may send implements power constraints and/or other control commands to the implements 106 by way of the ICU 414 as denoted by arrow 502. Further, the power-management control unit 400 may send traction power constraints (e.g., drag and pull limitations) to the transmission 104 as indicated by arrow 504. As such, the power-management control unit 400 may set traction power limitations and to alter the transmission's gear ratio via clutch and hydrostatic pump adjustment the transmission 104.

The power-management control unit 400 may send engine speed and/or power requests to the engine 102 by way of the ECU 406 as denoted via arrow 506. The power-management control unit 400 may further send control commands to the auxiliary systems 118 and/or receive auxiliary system power usage data by way of the ECU 406. Additionally, the power-management control unit 400 may send brake power requests to the auxiliary components 116 by way of the VCU 408 to generate drag power, under certain conditions, as indicated via arrow 508. In this way, the power-management control unit 400 is designed to cooperatively send power limitations to the transmission and the implements to permit the control unit to efficiently manage power distribution in the vehicle system 101.

Further, the power-management control unit 400 may, during certain drag conditions, request actuation of a component in auxiliary system 118 (e.g., the retarder 122 and/or the energy accumulator 120, auxiliary components 116 (e.g., cooling fan), as indicated via arrow 510, with the aim of increasing the available brake energy during vehicle deceleration. In this way, the power-management control unit 400 may command selected components during deceleration to waste, store, and/or more efficiently use excess energy.

The power-management control unit 400 may further be designed to constrain (e.g., limit) the maximum power absorption of the implements and may balance the power absorption for traction and implements based on priorities that may be assigned by the equipment manufacturers. Still further, the power-management control unit 400 may be designed to operate the vehicle system in a mode where the control unit sends a speed set-point request to the engine 102 that is capable of satisfying the power demand of the transmission.

The power-management control unit 400 is designed to increase power distribution efficiency with regard to the transmission 104 and the implements 106. To that end, the power-management control unit 400 is configured to control (e.g., continuously control) a maximum power available for traction and implements taking into account the current power requests of the auxiliary component(s) and system(s), the available engine power, signals from HMIs that are generated responsive to operator interaction, system priorities that may be defined by the equipment manufacturers (e.g., the OEMs), as well as other factors. Further, by knowing the vehicle power request and the engine speed-power characteristics, the power-management control unit may calculate a low (e.g., a minimum) target engine speed that achieves the power demands with low (e.g., minimum) fuel consumption.

Figure 6A:
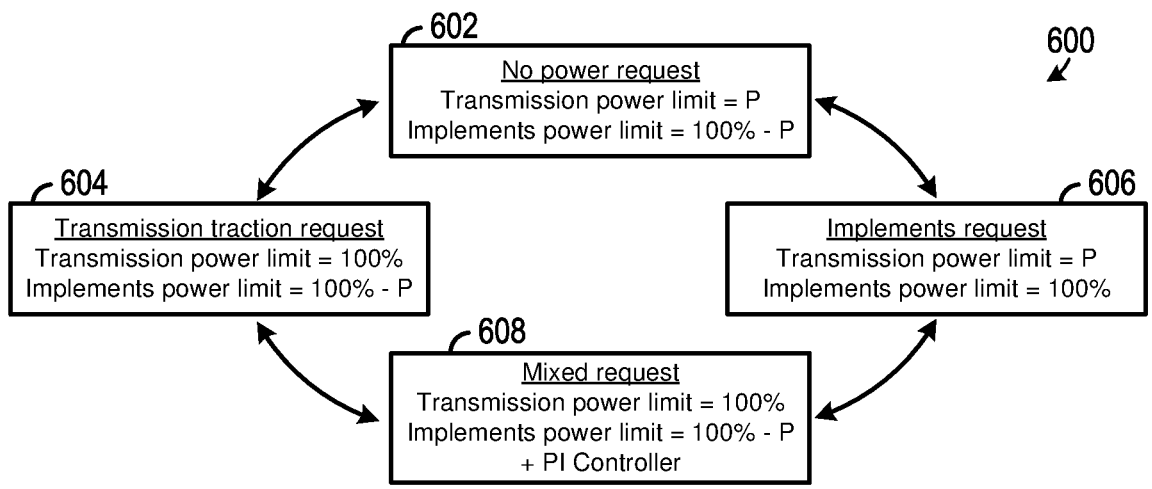
FIG. 6(A) is a power management control architecture for a vehicle system with a power-management control unit.
Figure 6B:
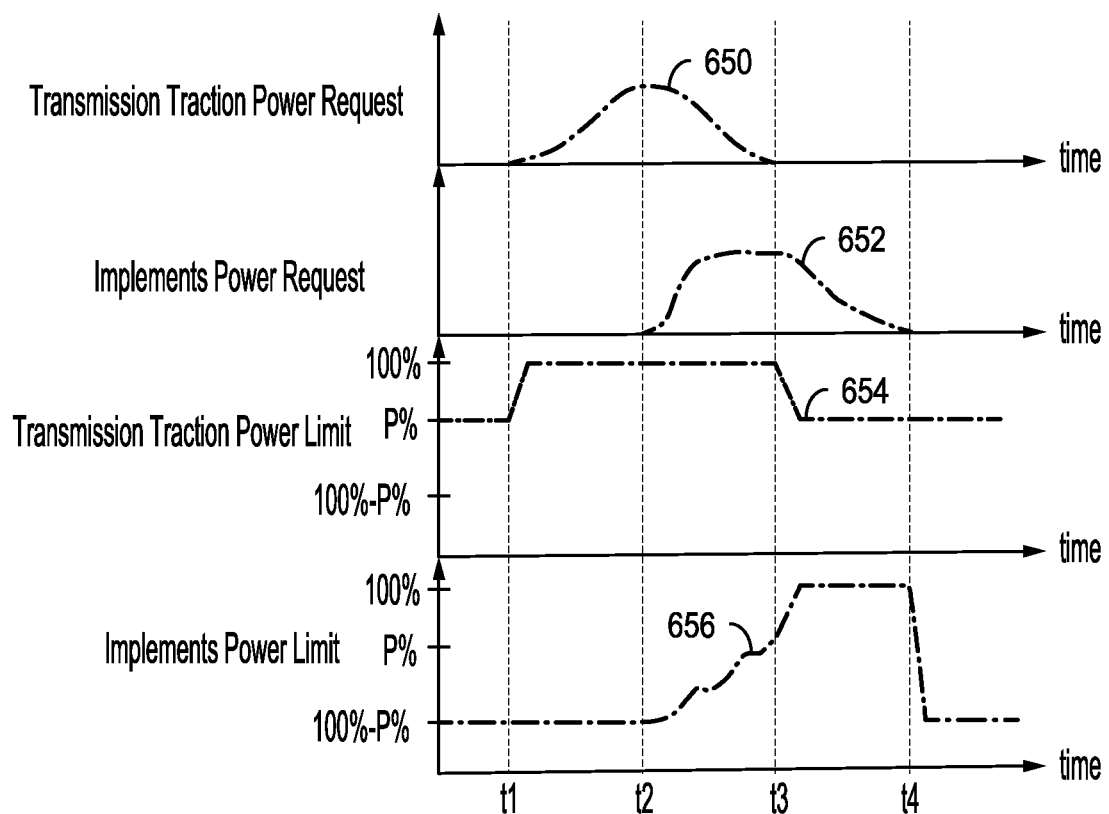
FIG. 6(B) is a graphical representation of a use-case vehicle system power management strategy using the control architecture, depicted in FIG. 6(A).

FIG. 6(A) shows an exemplary power allocation logic 600 for the power-management control unit and FIG. 6(B) illustrates prophetic use-case graphical representations of the power allocation scheme. For each plot, time is indicated on the abscissa. Specifically, in FIG. 6(B) plot 650 has a transmission traction power request on the ordinate, plot 652 has implements power request on the ordinate, plot 654 has implements power request on the ordinate, plot 654 has transmission traction power limit on the ordinate, and plot 656 has implements power limit on the ordinate. Although specific numerical values are not provided, points of interest are indicated at t1-t4.

Blocks in the diagram of FIG. 6(A) represent programmatic calculations that may be carried out by executing instruction stored in memory of the power-management control unit. Generally, the power management logic splits the available net power based on a transmission power request, implements power request, and a priority value (P). The priority value may be the percentage of the maximum available net power to which the transmission is constrained. The priority value may be set or adjusted by the customer (e.g., OEM). In this way, a downstream manufacturer can select a power balance that is suited to their predilection and/or the vehicle's end-use operating environment. The power balance selected by the customer may be expressed as a percentage allocated for the implements and for traction (e.g., 50% implements & 50% traction or 60% implements & 40% traction, etc.). Generally, the logic in each of the blocks shown in FIG. 6(A) may generate a transmission traction and implements power limit that may expressed as a percentage of the maximum available net power. Further, the sum of the power limits for traction and the implements may be greater than 100%, in certain instances, because traction and implements have a low chance of being simultaneously used at their maximum power.

At block 602, there is no power request for traction or implements. Under the no power request condition, the transmission power limit may be equal to P and the implements power limit may be equal to 100%–P.

At block 604, there is a transmission traction power request and no implement power request. Under these conditions, the transmission traction power limit may be 100% and the implements power limit may be 100%–P. As such, the traction power may not be constrained by the implements when there is no power request coming from the implements.

Conversely, at block 606, there is an implements power request and no transmission traction power request. Under this condition, the transmission traction power limit may be P and the implements power limit may be 100%. In this way, the implements power may not be constrained by the traction power when there is not a traction power request.

At block 608, there are both an implements power request and transmission traction power request which may be referred to as a combined maneuver. Under these conditions, the transmission traction power limit may be 100%. Additionally, the implements power limit is calculation may be 100%−P+a controller term. The controller term may represent an output of a proportional integral (PI) controller. The output of the PI control aims to increase (e.g., maximize) engine load, thereby increasing engine efficiency by avoiding waste energy. However, in other examples, the PI controller term may be omitted from the implements power limit calculation when a mixed request is present. The aforementioned limits, in each of the different operating conditions blocks, may be continuously calculated during transmission operation and applied to the operation of the transmission for traction and implements operation. In this way, during combined maneuvers, the controlled power hand-over between the two power consumers is managed to reduce the likelihood of engine overload during transients. Further, the customer (e.g., OEM) may be allowed to set the priorities for implements and traction, specifically during the combined maneuver. As such, the customer is allowed to tailor the power balance between traction and implements according to their predilection, thereby increasing customer satisfaction.

As indicated above, during a combined maneuver an algorithm for controlling power allocation which omits the PI controller may be used, in one embodiment. This control strategy, may use the following algorithms:

$$\text{Implements power limit} = \text{maximum}\{100\% - \text{Transmission power requests}, 100\% - P\} \quad (1)$$

$$\text{Transmission power limit} = \text{maximum}\{100\% - \text{Implements power request}, P\} \quad (2)$$

Continuing with the aforementioned embodiment, the implements power request may be the estimation of the actual implements power absorbed by implements. If the implements power request cannot be accurately estimated, Boolean information (e.g., USED/NOT USED) which is calculated based on a joystick request, then the following algorithms may further be used in this controls strategy:

$$\text{Implements power limit} = \text{maximum}\{100\% - \text{Transmission power request}, 100\% - P\} \quad (3)$$

$$\text{Transmission power limit} = 100\% \quad (4)$$

Turning to FIG. 6(B), from t0 to t1, there is neither a traction request or an implements request. Under the no power request condition, the transmission traction limit is set at P and the implements power limit is set at 100%−P. At t1, a traction request begins while the implements request remains at zero. Under the transmission power request condition, the transmission traction limit is increased to 100% while the implements power limit remains at 100%−P.

At t2, an implements requests begins while the transmission traction request is sustained. Under the mixed request condition, the transmission traction power limit remains at 100% while the implements power limit increases from 100%−P to P.

At t3, the transmission traction power request ends while the implements power request persists. Under the implements power request condition, the transmission traction power limit is decreased to P and the implements power limit is increased to 100%. Managing the power constraints for the traction and implements power in this manner enables power distribution, particularly during combined maneuvers, to be strategically balanced based on priorities that may be set by the customer, for instance. Consequently, the power distribution for traction and implements performance may more aptly match the demands of the end-use environment. Moreover, additional power management logic may be implemented to reduce the chance of the transmission and/or implements from overloading the engine.

The power-management control unit may further be designed to carry out a power management strategy during drag maneuvers. In this control strategy, when the drag power request is too high (e.g., causing the engine to over-speed), the power-management control unit logic may request actuation of additional engine braking via a retarder, the energy accumulator(s), or controllable vehicle auxiliary components. Further, in this example, a PI controller may keep the engine speed near a set-point by adjusting engine speed in response to the degree to which the braking systems (e.g., the retarder, the energy accumulator, and/or the smart auxiliary components) are dissipating power. In this way, it is possible to indirectly control the engine during drag operation by regulating the power dissipating or energy storing devices.

Figure 7:
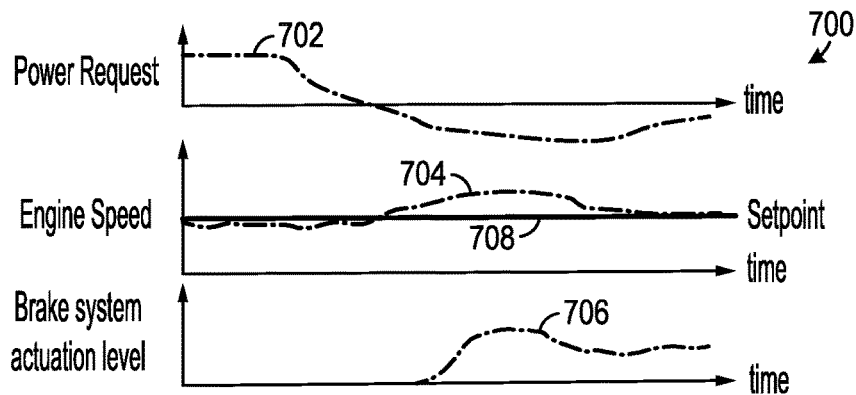
FIG. 7 is a graphical depiction of a drag power management strategy.

FIG. 7 shows a graphical representation 700 of a prophetic use-case drag power management strategy. For each plot time is indicated on the abscissa and increases from left to right. For plot 702, the power request is on the ordinate, plot 704 has engine speed on the ordinate, and plot 706 has brake system actuation level on the ordinate. As shown, as the power request falls below zero the engine speed increases and responsive to the engine speed increase, the brake system actuation level is increased to maintain the engine speed near a set-point 708. In this way, engine braking devices such as a retarder, energy accumulator, a smart auxiliary vehicle component (e.g., a fan, a water pump, etc.), and the like may be used to maintain the engine speed around a desired value during a drag maneuver to avoid engine overspeeding. Consequently, engine degradation from overspeeding may be avoided, thereby increasing engine longevity.

Figure 8:
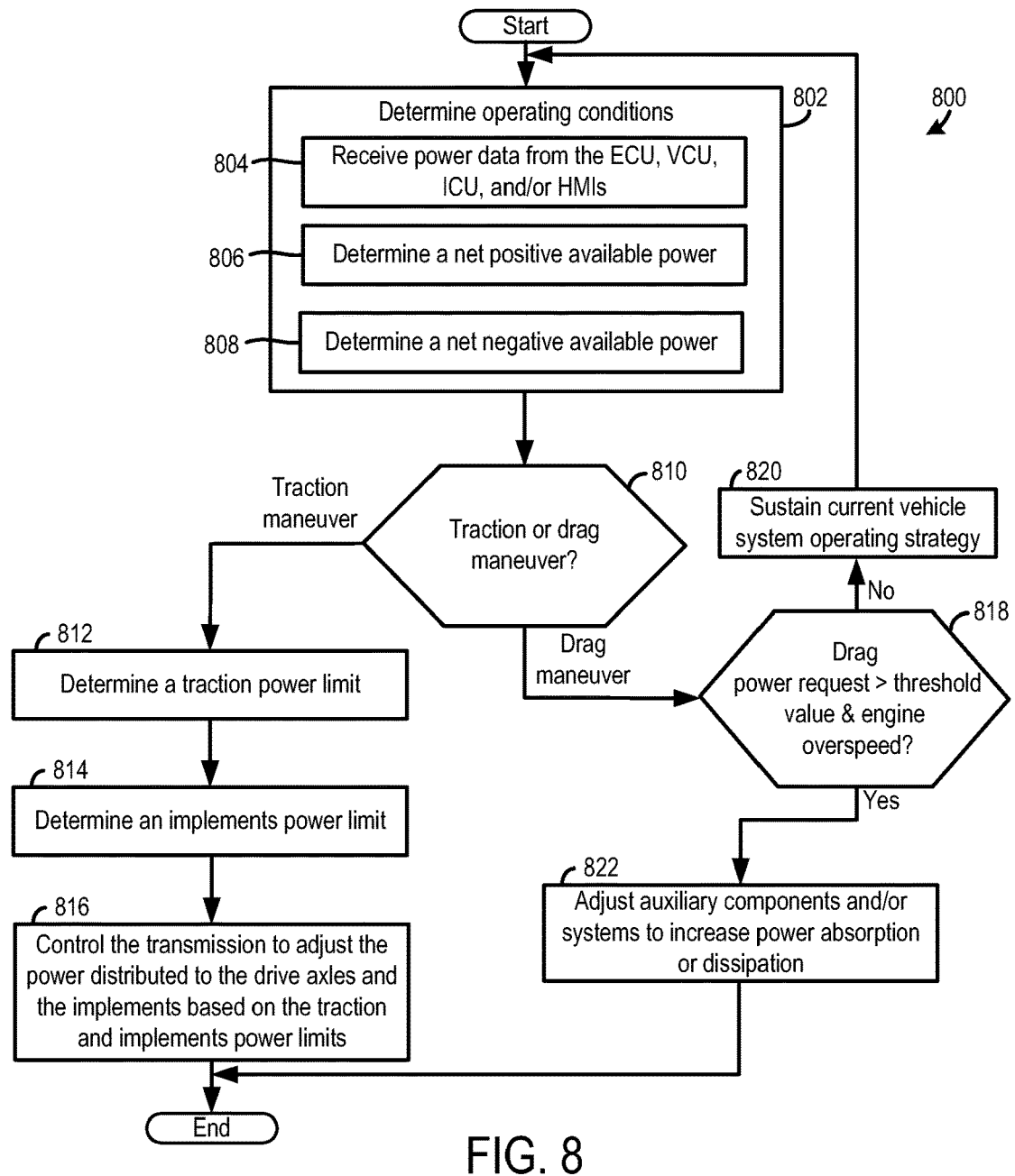
FIG. 8 is a method for operation of a vehicle system using a power-management unit.

FIG. 8 shows a method 800 for operation of a vehicle system with a hydromechanical transmission. The method 800 may be carried out by the vehicle systems, hydromechanical transmissions, and components described herein with regard to FIGS. 1-7 and 9, in one example. However, in other examples, the method 800 may be implemented using other suitable vehicle systems, hydromechanical transmissions, and corresponding components. Specifically, the method may be carried out as instructions stored in memory executed by a processor in a power-management control unit (e.g., the power-management control unit 400, shown in FIGS. 4 and 5). As such, performing the method steps may include sending and/or receiving commands which trigger adjustment of associate components, as previously indicated.

At 802, the method includes determining operating conditions. The operating conditions may include transmission traction power requests, implements power requests, engine speed, wheel speed, transmission power losses, auxiliary device power absorption, and the like. These operating conditions may be determined using sensor data, HMI data, and/or modeling algorithms. Specifically, step 802 may include steps 804-808. At 804, the method includes receiving power data from the ECU, VCU, ICU, and/or HMIs that provide implements and traction power request data. At 806, the method includes determining a net positive available power in the transmission, and at 808, the method includes determining a net negative available power in the transmission. As previously discussed, the net positive available power may be determined by subtracting transmission power losses and auxiliary power absorption from a maximum engine power available. Further, the net negative available power may be determined by summing a minimum engine drag power, the auxiliary component/system power absorption, and transmission power losses.

At 810, the method judges if a traction drive or a drag maneuver in the vehicle is occurring. For instance, the control unit may determine if the vehicle is accelerating or decelerating based on wheel speed, transmission speed, and/or engine speed. If a traction drive maneuver is occurring, the method moves to 812.

At 812, the method includes determining a traction power limit and at 814 the method includes determining an implements power limit. These power limits may be calculated using the techniques discussed above with regard to FIGS. 6(A) and 6(B). Additionally, during a traction maneuver, the power manager may send the power request to the engine. For instance, the power manager may set the engine speed set-point for the engine. This engine speed set-point may depend on the sum of implement and transmission power requests. The relationship between the engine speed set point and the power request may be provided by an engine characteristics curve. For instance, initially the engine speed set-point may be calculated based on the transmission power request, as previously indicated, but then the calculated value may be increased by a certain margin (e.g., 200 revolutions per minute (RPM), in one use-case example). The margin may depend on the implements power request. In this way, the engine may satisfy most or all the power use requests in terms of available power, in some cases.

Next at 816, the method includes controlling the transmission to adjust the power distributed to the drive axles and the implements based on the traction and implements power limits. Specifically, in one example, this power distribution step may include, during a traction maneuver, sending an engine speed set-point that is determined based on the implements and traction requests to the engine from the power-management control unit. In this way, the power delivered to the axles and the implements may be effectively distributed to achieve the power allocation preferences of the customer, if wanted.

Conversely, if a drag maneuver is occurring, the method proceeds to 818. At 818, the method includes determining if the drag power request is greater than a threshold value and the actual engine speed indicates an overspeed condition is present. An engine overspeed condition may be occurring when the difference between the engine speed and the engine speed set-point surpasses a threshold value. If the drag power request does not exceed the threshold value or an engine overspeed condition is not present (NO at 818) the method moves to 820, where the method includes sustaining the current vehicle system operating strategy. For instance, the transmission may be operated at a desired gear ratio while the engine is backdriven.

On the other hand, if the drag power request exceeds the threshold value and an engine overspeed condition is present (YES at 818), the method moves to 822, where the method includes adjusting auxiliary components and/or systems to increase power absorption or dissipation. Method 800 allows the power distribution in the vehicle system to be strategically allocated based on system efficiency and preferences of the customer (e.g., downstream manufactures such as OEMs). Vehicle efficiency and customer satisfaction may be consequently increased.

Figure 9:
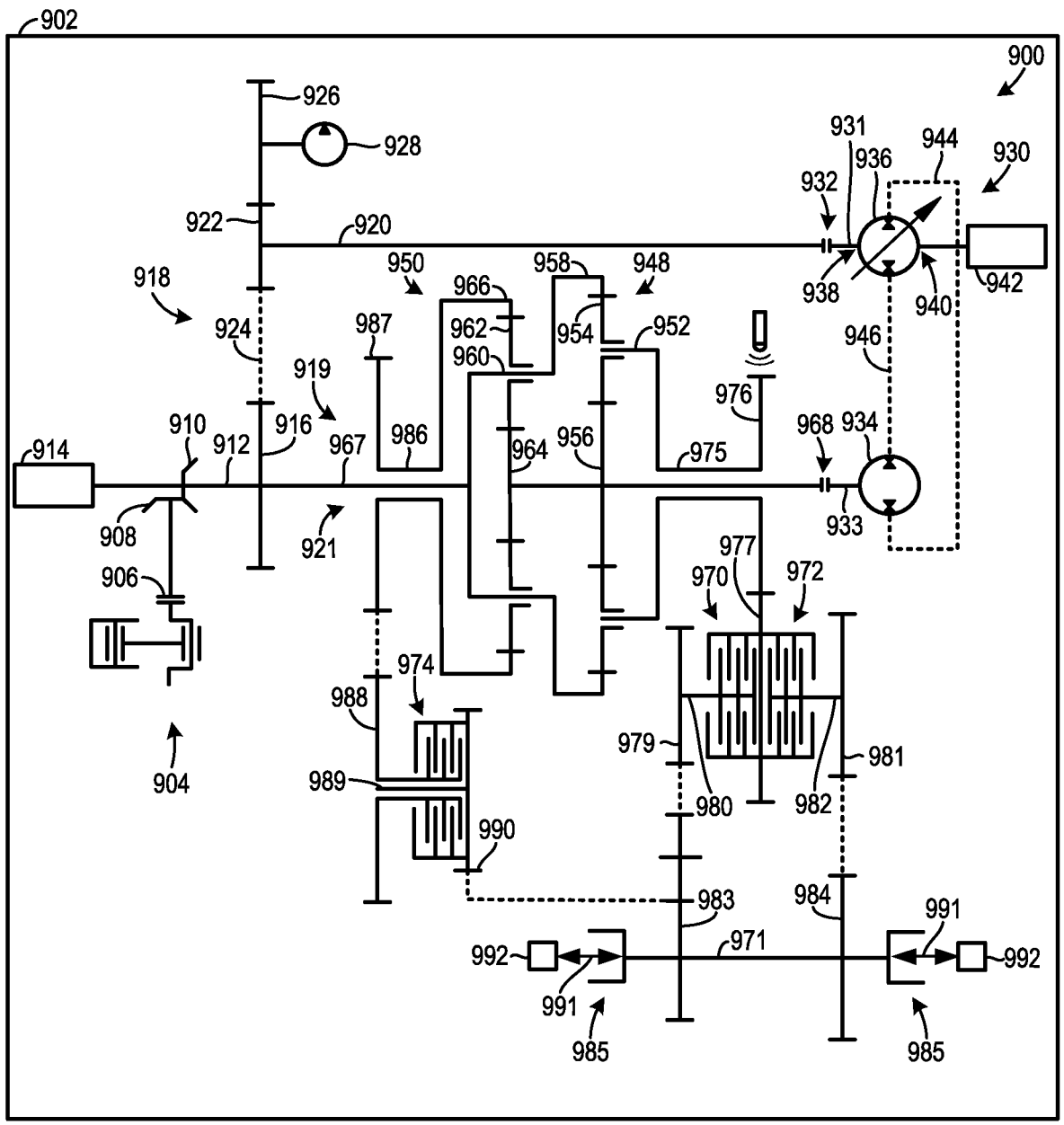
FIG. 9 is a schematic depiction of an exemplary hydromechanical transmission.

FIG. 9 shows a schematic depiction of a transmission 900 (e.g., an HVT) in a vehicle 902. The vehicle 902 and the transmission 900 are examples of the vehicle 100 and the transmission 104, depicted in FIG. 1. Therefore, the transmission 900 may include structural and/or function features from the transmission 104, or vice versa.

The transmission 900 may function as an IVT where the transmission's gear ratio is controlled continuously from a negative maximum speed to a positive maximum speed with an infinite number of ratio points. In this way, the transmission can achieve a comparatively high level of adaptability and efficiency when compared to transmission which operate in discrete ratios.

The transmission 900 may have asymmetric maximum output speeds for forward and reverse direction. This forward-reverse speed asymmetry may enable the transmission to achieve a desired breadth of speed ranges. However, other suitable output speed variations have been contemplated, such as symmetric output speeds in the forward and reverse directions, which may however, demand the use of an additional clutch which may increase system complexity.

The transmission 900 may include or receive power from a motive power source 904. The power source 904 may include an internal combustion engine, electric motor (e.g., electric motor-generator), combinations thereof, and the like.

A torsional damper coupling 906 may be further provided in the transmission. Gears 908, 910, such as bevel gears, may be used to rotationally couple the power source 904 to an input shaft 912. As described herein, a gear may be a mechanical component which rotates and includes teeth that are profiled to mesh with teeth in one or more corresponding gears to form a mechanical connection that allows rotational energy transfer therethrough.

A mechanical power take-off (PTO) 914 may be coupled to the input shaft 912. The mechanical PTO 914 may drive an auxiliary system such as a pump (e.g., a hydraulic pump, a pneumatic pump, and the like), a winch, a boom, a bed raising assembly, etc. To accomplish the power transfer to auxiliary components, the PTO may include an interface, shaft(s), housing, and the like. However, in other examples, the PTO may be omitted from the transmission system. A gear 916 may be coupled to the input shaft 912. A mechanical assembly 918 is further included in the transmission 900. The mechanical assembly 918 may include the shaft 912 and/or the gear 916 as well as shaft 967, described in greater detail herein. Further, the transmission may include a shaft 920 and a gear 922 rotationally coupled to the gear 916 on the input shaft 912. Dashed line 924 and the other dashes lines depicted in FIG. 9 indicate a mechanical connection between components which facilitates rotational energy transfer therebetween.

A gear 926 meshing with gear 922 may be rotationally attached to a charging pump 928 (e.g., hydraulic pump). The charging pump 928 may be designed to deliver pressurized fluid to hydraulic components in the transmission such as a hydraulic motor 934 (e.g., hydrostatic motor), a hydraulic pump 936 (e.g., hydrostatic pump), and the like. The fluid pressurized by the charging pump may additionally be used for clutch actuator and/or transmission lubrication. The charging pump may include a piston, a rotor, a housing, chamber(s), and the like to allow the pump to move fluid. The mechanical assembly 918 is rotationally coupled in parallel to a hydrostatic assembly 930. Further, the hydrostatic assembly 930 may have a U-shape design where the shafts 931, 933 serving as a mechanical interface for the hydraulic pump 936 (e.g., variable displacement pump) and the hydraulic motor 934 (e.g., fixed bent axis motor), respectively, are parallel to one another and arranged on one side of the assembly. This U-shaped layout permits the hydrostatic assembly's size to be reduced and enables the use of high pressure hoses to be forgone to reduce manufacturing costs as well the chance of hydrostatic unit degradation, if desired. Still further, the hydrostatic assembly 930 may be arranged on an opposite side of the transmission as the charging pump 928 and/or axially offset from clutches 970, 972. Arranging the hydrostatic assembly in this manner permits the width of the transmission to be reduced and allows the installation of the transmission in the vehicle to be simplified.

The coupling of the hydrostatic assembly to the mechanical assembly enables the transmission to achieve power split functionality in which power may synchronously flow through either path to additively combine or recirculate power through the system. This power split arrangement enables the transmission's power flow to be highly adaptable to increase efficiency over a wide range of operating conditions. Thus, the transmission may be a full power split transmission, in one example.

The mechanical assembly 918 may include multiple mechanical paths that are coupled in parallel to the hydrostatic assembly. To elaborate, the shaft 967 may serve as a junction for a first mechanical path (e.g., branch) 919 and a second mechanical path (e.g., branch) 921. The first mechanical path 919 may provide rotational energy transfer capabilities from an interface of the hydrostatic assembly 930 to a ring gear 958 of a first planetary gear set 948, during certain operating conditions. Additionally, the second mechanical path 921 may provide rotational energy transfer capabilities from the interface of the hydrostatic assembly 930 to a carrier 960 of a second planetary gear set 950.

The hydrostatic assembly 930 includes the hydraulic motor 934 and the hydraulic pump 936. Further, the hydraulic pump 936 may include a first mechanical interface 938 and a second mechanical interface 940. The first mechanical interface 938 may be rotationally coupled to a mechanical bushing 932 and the second mechanical interface 940 may be rotationally coupled to another mechanical PTO 942. Again, the mechanical PTO may be used to drive an auxiliary vehicle system such as an air compressor, a mechanical arm or boom, an auger, etc. In this way, the transmission may be adapted for a variety of operating environments. Providing multiple PTOs, in the arrangement depicted in FIG. 9, enables the transmission system to meet end-use design goals in a variety of different types of vehicles, if wanted. As such, the system's applicability is expanded and the customer appeal of the transmission is increased. However, in other examples, the PTOs 914 and/or 942 may be omitted from the transmission.

The hydraulic pump 936 may be a variable displacement bi-directional pump, in one example. Further, the pump may be an axial piston pump, in one instance. To elaborate, the axial piston pump may include a swash plate that interacts with pistons and cylinders to alter the pump's displacement via a change in swivel angle, in one specific example. However, other suitable types of variable displacement bi-directional pumps have been contemplated.

The hydraulic motor 934 may be a fixed displacement bi-directional motor (e.g., fixed bent axis motor). The fixed bent axis motor is relatively compact when compared to variable displacement motors. The system can therefore achieve greater space efficiency and pose less space constraints on other systems in the vehicle, if desired. However, alternate types of pumps and/or motors may be used, if motor adjustability is favored at the expense of compactness, for instance.

Hydraulic lines 944, 946 are attached to hydraulic interfaces in each of the motor and pump to enable the hydrostatic assembly to provide additive and power circulation functionality with regard to the mechanical branches arranged in parallel with the hydrostatic assembly 930. For example, in an additive power mode, power from both the hydrostatic and mechanical assemblies is combined at one of the planetary gear sets and delivered to the transmission output. In a power split mode, power is recirculated through the hydrostatic assembly. Therefore, the hydraulic pump 936 and the motor 934 may be operated to flow power to the sun gears of either planetary assembly from the hydraulic motor. Conversely, the pump and the motor may be operated to flow power back to the gear set and the mechanical branches.

The transmission 900 may further include the first planetary gear set 948 and the second planetary gear set 950. The first planetary gear set 948 may include a carrier 952 on which planet gears 954 rotate. The planet gears 954 may mesh with a sun gear 956 and the ring gear 958. Likewise, the second planetary gear set 950 may include the carrier 960, planet gears 962, a sun gear 964, and a ring gear 966. Therefore, the second planetary gear set 950 may again be a simple planetary gear set. Further, bearings arranged between the planet gears and the carrier in each planetary arrangement may facilitate rotation thereof. The sun gears and/or shafts to which they are attached may further have bearings coupled thereto. The bearings may be roller bearings (e.g., needle roller bearings), ball bearings, or other suitable types of bearings that enable component rotation while constraining other relative motion.

The carrier 960 of the second planetary gear set 950 may be rotationally coupled to the ring gear 958 of the first planetary gear set 948. Further, the carrier 960 of the second planetary gear set 950 may be rotationally coupled to a shaft 967. The shaft 967 may extend through a central opening in an extension 986, described in greater detail herein. This rotational attachment scheme may be conceptually described as a formation of mechanical branches attached in parallel to the hydrostatic assembly 930.

As described herein a parallel attachment between components, assemblies, etc., denotes that the input and output of the two components or grouping of components are rotationally coupled to one another. This parallel arrangement allows power to recirculate through the hydrostatic assembly, during some conditions, or be additively combined from the mechanical and hydrostatic branches, during other conditions. As a result, the transmission's adaptability is increased, which allows gains in operating efficiency to be realized, when compared to purely hydrostatic transmissions.

The sun gears 956, 964 of the first and second planetary gear sets 948, 950 may be rotationally coupled (e.g., directly attached) to one another. Attaching the sun gears in this manner may enable the transmission to achieve a desired gear ratio, compactness, and efficiency.

The hydraulic motor 934 may be rotationally coupled to the sun gear 956 via a mechanical bushing 968, for instance. The transmission 900 further includes a reverse clutch 970, a first forward drive clutch 972, and a second forward drive clutch 974. The clutches 970, 972, 974 may be positioned near to an output shaft 971 and downstream of the planetary assembly. Arranging the clutches in this location allows a targeted compromise between clutch size and clutch speed. For instance, relatively high clutch speeds may generate higher power losses. Further, the reverse clutch 970 and the first forward drive clutch 972 may be arranged adjacent and coaxial to one another. In one particular example, the clutches may have a similar design to reduce manufacturing complexity. This twin clutch arrangement therefore permits manufacturing costs to be reduced and increases the transmission's compactness.

The clutches 970, 972, 974 may be friction clutches that each includes two sets of plates. The clutch plates may rotate about a common axis and are designed to engage and disengage one another to facilitate selective power transfer to downstream components. In this way, the clutches may be closed and opened to place them in engaged and disengaged states. In the disengaged state, power does not pass through the clutch. Conversely in the engaged state, power travels through the clutch during transmission operation. The carrier 952 may include an extension 975 with a gear 976 that meshes with a gear 977. The gear 977, in the illustrated example, is rotationally coupled to the reverse clutch 970 and the first forward clutch 972. The reverse clutch 970 and the first forward clutch 972 are shown arranged adjacent to one another and may share a common rotational axis. Because of this proximal clutch arrangement, the system may exhibit greater compactness which poses less space constraints on adjoining vehicle systems. Alternatively, the reverse clutch may be spaced away from the first forward clutch which may, however, decrease system compactness.

A gear 979 may reside on an output shaft 980 of the reverse clutch 970. Likewise, a gear 981 may reside on an output shaft 982 of the first forward clutch 972. Both gears 979, 981 may be rotationally attached to the system output shaft 971 via gears 983, 984 respectively. In this way, both the reverse clutch and the first forward clutch deliver power to the transmission's output, during different operating conditions.

The system output shaft 971 may include one or more interfaces 985 (e.g., yokes, gears, chains, combinations thereof, etc.). The output shaft is specifically illustrated with two outputs. However, the transmission may include an alternate numbers of outputs. The gear 979 is rotationally coupled to the output shaft via meshing with gear 983. Arrows 991 depict the flow of power from the transmission system to drive axles 992 and/or other suitable downstream vehicle components or vice versa. A driveline with a shaft, joints, etc. may be used to carry out the power transfer between the transmission and the axles. It will be understood that the drive axles may include drive wheels.

The ring gear 966 of the second planetary gear set 950 may include the extension 986 with a gear 987 position thereon. The gear 987 may be rotationally attached to a gear 988 in the second forward clutch 974, as indicated via a dashed line. The gear 988 may be coupled to a first set of plates in the clutch 974. A second set of plates in the clutch may be attached to an output shaft 989 and a gear 990. The gear 990 may be rotationally coupled to the gear 983, as indicated by a dashed line. Due to the aforementioned arrangement of the clutches and the planetary gear sets, the transmission 900 achieves a higher efficiency and enhanced drivability, comfort, and productivity than previous hydromechanical transmissions.

The technical effect of the vehicle system power distribution strategies described herein is to increase the system's efficiency while increasing the system's adaptability with regard to implement and traction priorities of the customer. Another technical effect of the power distribution strategies described herein is to enhance the system integration on vehicle and adapt to different customer's or application's demands.

The invention will be further described in the following paragraphs. In one aspect, a vehicle system is provided that comprises a hydromechanical transmission comprising: a power-take off (PTO) designed to rotationally couple to an implement; an engine coupled to the hydromechanical transmission; a power-management control unit including instructions that when executed, during a drive or coast condition, cause the power-management control unit to: determine a net available power for the hydromechanical transmission; and manage a power flow between the hydromechanical transmission, a drive axle, and the implement based on the net available power.

In another aspect, a method for managing power in a vehicle system is provided that comprises at a power-management control unit, receiving power use data from one or more of an engine control unit (ECU), a vehicle control unit (VCU), and an implement control unit (ICU); determining a net positive available power or a net negative available power for a hydromechanical transmission; and distributing power from the engine through the hydromechanical transmission to a drive axle and an implement based on the net positive available power or the net negative available power; wherein the implement is coupled to a power-take off (PTO) in the hydromechanical transmission; and wherein the drive axle is coupled to an output gear of the hydromechanical transmission. In one example, distributing the power may include: determining an implement power limit expressed as a first percentage of the net available positive power; determining a traction power limit expressed as a second percentage of the net available positive power; and controlling the hydromechanical transmission to adjust the power transferred from the hydromechanical transmission to the implement and the drive axle based on the first percentage and the second percentage, respectively. Further, in one example, distributing the power from the engine may include, during a traction maneuver, sending a power command (e.g., power requirement) to the engine (e.g., as an engine speed set-point). The power command may be generated based on the implements and traction requests.

Further in one example, distributing the power may include during a drag maneuver when a drag power request surpasses a threshold value and actual engine speed indicates an overspeed condition, command actuation of a retarder, an energy accumulator, and/or an auxiliary component to increase power dissipation or absorption; wherein the retarder, the energy accumulator, and the auxiliary component are coupled to the engine. Still further in one example, distributing the power may include during a combined maneuver, when power is transferred to both the implement and the drive axle from the hydromechanical transmission, splitting the net positive available power delivered to the drive axle and the implement from the hydromechanical transmission based on a traction power request, an implement power request, and priorities of the traction and implement power. In yet another example, in the method the net positive available power may be determined by subtracting transmission power losses and auxiliary component power absorption from a maximum available engine power; and the net negative available power may be determined by summing a minimum engine drag power, an auxiliary component power absorption, and transmission power losses.

In yet another aspect, a vehicle system, is provided that comprises a power-management control unit including instructions that when executed, during operating of a hydromechanical transmission, cause the power-management control unit to: determine a net available power for the hydromechanical transmission via data gathered from one or more of an engine control unit (ECU), a vehicle control unit (VCU), and an implement control unit (ICU), wherein the data includes a power demand of an auxiliary component and/or an auxiliary system driven by an engine; and balance a power flow from the hydromechanical transmission to a traction system and an implement system as percentages of the net available power.

In any of the aspects or combinations of the aspects, managing the power flow may include, during a combined maneuver, when power is transferred to both the implement and the drive axle from the hydromechanical transmission, balancing the power flow to the implement and the drive axle from the hydromechanical transmission based on a priority of the implement and a priority of drive axle traction.

In any of the aspects or combinations of the aspects, the net available power may be a net positive available power; and managing the power flow may include limiting an amount of power transferred to the drive axle from the hydromechanical transmission based on a first percentage of the net available power and limiting an amount of power transferred to the hydromechanical transmission from the implement based on a second percentage of the net available power.

In any of the aspects or combinations of the aspects, the net available power may be determined via data received from one or more of an engine control unit (ECU), a vehicle control unit (VCU), and an implements control unit (ICU).

In any of the aspects or combinations of the aspects, the data received from one or more of the ECU, the VCU, and the ICU may include power absorbed by auxiliary components and/or systems that are driven by the engine.

In any of the aspects or combinations of the aspects, the net available power may be a net negative available power and the power-management control unit may comprise: instructions that when executed, responsive to a drag power request surpassing a threshold value, cause the power-management control unit to: command actuation of a retarder, an energy accumulator, and/or an auxiliary component to increase power absorption and/or dissipation; wherein the retarder, the energy accumulator, and the auxiliary component may be coupled to the engine.

In any of the aspects or combinations of the aspects, commanding actuation of the retarder, the energy accumulator, and/or the auxiliary component may include operating a proportional integral (PI) controller to maintain the engine speed at or near a set-point based on an amount of power dissipation occurring in the retarder, the energy accumulator, and/or the auxiliary component.

In any of the aspects or combinations of the aspects, the energy accumulator may be a hydraulic accumulator and the auxiliary component is an alternator, a fan, or a brake pump.

In any of the aspects or combinations of the aspects, wherein the power-management control unit may comprise instructions that when executed cause the power-management control unit to: generate an engine speed set-point that satisfies a power demand of the hydromechanical transmission and/or other vehicle systems (e.g., one or more implements).

In any of the aspects or combinations of the aspects, the net available power may be determined based on losses of the hydromechanical transmission, the engine, the implement, and/or vehicle auxiliaries.

In any of the aspects or combinations of the aspects, the implement may be driven by a power-take-off (PTO) in the hydromechanical transmission and includes a hydraulic pump or a pneumatic pump.

In any of the aspects or combinations of the aspects, the net available power may be a net positive available power and the percentages of the net positive available power may be balanced based on a traction system power request, an implement system power request, and priorities of the traction and implement systems.

In any of the aspects or combinations of the aspects, the net available power may be a net negative available power and the power-management control unit may comprise instructions that when executed, in response to a drag power request, cause the power-management control unit to: command actuation of a retarder and an energy accumulator in the auxiliary system and/or the auxiliary component to generate engine drag; and maintain an engine speed at or near a set-point based on how much power the retarder, the energy accumulator, and/or auxiliary component are dissipating; wherein the retarder, the energy accumulator, and the auxiliary component may be coupled to the engine.

In any of the aspects or combinations of the aspects, balancing the power flow may include determining a minimum target engine speed that matches power demands of the traction system, the implement system, the auxiliary component, and/or the auxiliary system.

In any of the aspects or combinations of the aspects, adjusting the transmission to alter the power delivered to the implements and the axles may include adjusting a hydraulic pump (e.g., adjusting the pump's swivel angle), adjusting a hydraulic motor, and/or adjusting clutches to alter the power flow to the PTO and the implements correspondingly and/or the vehicle drive axles.

In any of the aspects or combinations of the aspects, the power management control unit may further include instructions that when executed, in response to the drag power request, cause the power management control unit to: control power absorbed by one or more implements in the implement system and/or one or more auxiliaries in the auxiliary system based on the net available power.

In another representation, a power manager controller for a vehicle-wide system with a hydromechanical transmission is provided that include instructions that when executed during a traction maneuver cause the controller to: determine a total power available in the transmission and augment the distribution of the total available power to a vehicle axle and an implement connected to a power-take off (PTO) based on an adjustable priority of the implement and traction.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:
   a hydromechanical transmission configured to rotationally couple to a motive power source;
   a power-take off (PTO) configured to rotationally couple to an implement; and
   a power-management control unit in electronic communication with a vehicle control unit (VCU), an engine control unit (ECU), and an implements control unit (ICU) and including instructions that when executed, during a drive condition or a coast condition, cause the power-management control unit to:
      receive power data from the VCU, the ECU, and the ICU;
      determine a net available power for the hydromechanical transmission based on the power data; and
      manage a power flow between the hydromechanical transmission, a drive axle, and the implement based on the net available power, a transmission power limit, an implement power limit, and a priority value;
   wherein the priority value is a portion of the net available power to which the hydromechanical transmission is constrained;
   wherein the transmission power limit and the implement power limit are adjusted based on a transmission traction request condition, an implement request condition, and a mixed transmission traction request and implement request condition; and
   wherein during the mixed transmission traction request and implement request condition, the implement power limit is reduced based on the priority value and increased based on a proportional integral (PI) controller term.

2. The transmission system of claim 1, wherein the motive power source is an engine.

3. The transmission system of claim 2, wherein the hydromechanical transmission includes two forward drive clutches and a reverse drive clutch.

4. The transmission system of claim 2, wherein the engine is a compression ignition engine.

5. The transmission system of claim 1, wherein the hydromechanical transmission includes a hydrostatic assembly with a hydraulic pump and a hydraulic motor.

6. The transmission system of claim 1, wherein the net available power includes a net positive available power value and a net negative available power value.

7. The transmission system of claim 1, wherein the hydromechanical transmission is a hydromechanical variable transmission (HVT).

8. The transmission system of claim 7, wherein the HVT has an asymmetric number of forward drive ranges and reverse drive ranges.

9. A method for managing power in a vehicle system, comprising:
   at a power-management control unit, receiving power data from one or more of an engine control unit (ECU), a vehicle control unit (VCU), and an implement control unit (ICU);
      determining a net available power for a hydromechanical transmission based on the power data; and
      managing a power flow between the hydromechanical transmission, a drive axle, and an implement based on the net available power, a transmission power limit, an implement power limit, and a priority value;
   wherein the priority value is a portion of the net available power to which the hydromechanical transmission is constrained;
   wherein the transmission power limit and the implement power limit are adjusted based on a transmission traction request condition, an implement request condition, and a mixed transmission traction request and implement request condition; and
   wherein during the transmission traction request condition the implement power limit is reduced based on the priority value.

10. The method of claim 9, wherein during the implement request condition the transmission power limit is equal to the priority value.

11. The method of claim 9, wherein during the mixed transmission traction request and implement request condition the implement power limit is reduced based on the priority value and increased based on a proportional integral (PI) controller term.

12. The method of claim 9, wherein the priority value is adjustable.

13. A transmission system, comprising:
   a hydromechanical variable transmission (HVT) configured to rotationally couple to an internal combustion engine;
   a power-take off (PTO) configured to rotationally couple to an implement; and
   a power-management control unit in electronic communication with a vehicle control unit (VCU), an engine control unit (ECU), and an implement control unit (ICU) and including instructions that when executed, during a drive condition or a coast condition, cause the power-management control unit to:
  receive power data from the VCU, the ECU, and the ICU;
  determine a net available power for the HVT based on the power data; and
  manage a power flow between the HVT, a drive axle, and the implement based on the net available power, a transmission power limit, an implement power limit, and a priority value;
wherein the priority value is a portion of the net available power to which the HVT is constrained;
wherein the transmission power limit and the implement power limit are adjusted based on a transmission traction request condition, an implement request condition, and a mixed transmission traction request and implement request condition; and
wherein during the transmission traction request condition the implement power limit is reduced based on the priority value.

14. The transmission system of claim 13, wherein during the implement request condition the transmission power limit is equal to the priority value.

15. The transmission system of claim 13, wherein during the mixed transmission traction request and implement request condition, the implement power limit is reduced based on the priority value and increased based on a proportional integral (PI) controller term.

16. The transmission system of claim 13, wherein the priority value is adjustable.

* * * * *